United States Patent [19]

Wheatley et al.

[11] 4,176,057
[45] Nov. 27, 1979

[54] METHOD AND APPARATUS FOR RECOVERING LIQUID AND SOLID CONSTITUENTS OF WATER SOLUTIONS CONTAINING SPARINGLY SOLUBLE SOLIDS

[75] Inventors: Robert T. Wheatley; Louis J. Kosarek, both of El Paso, Tex.

[73] Assignee: El Paso Environmental Systems, Inc., El Paso, Tex.

[21] Appl. No.: 809,751

[22] Filed: Jun. 24, 1977

[51] Int. Cl.² .................... B01D 31/00; B01D 13/00
[52] U.S. Cl. .................... 210/23 H; 210/48; 210/58; 210/73 R; 210/137; 210/170; 210/188; 210/259; 210/433 M
[58] Field of Search .............. 210/23 H, 23 F, 433 M, 210/71, 321 R, 48, 58, 73 R, 137, 170, 188, 259 M

[56] References Cited

U.S. PATENT DOCUMENTS

| | | | |
|---|---|---|---|
| 3,677,405 | 7/1972 | Keith, Jr. | 210/71 |
| 3,795,609 | 3/1974 | Hill et al. | 210/23 H |
| 3,956,114 | 5/1976 | Del Pico et al. | 210/23 F |
| 4,036,749 | 7/1977 | Anderson | 210/23 H |

OTHER PUBLICATIONS

"Reverse Osmosis Membrane Regeneration", from OSW R & D Report #471, 80 pp., pp. 1, 2, 34–37, 54–59.

*Primary Examiner*—Frank A. Spear, Jr.
*Attorney, Agent, or Firm*—Hill, Van Santen, Steadman, Chiara & Simpson

[57] ABSTRACT

Water, such as the effluent from cooling towers, boilers, waste streams of industrial plants, hydrometallurgical processes or other sources of water solutions containing sparingly soluble solids is efficiently separated into its aqueous and solid constituents by reverse osmosis and chemical treatments effective to achieve a zero discharge of effluent and a minimum volume of sludge or a recovery of valuable solids.

13 Claims, 4 Drawing Figures

METHOD AND APPARATUS FOR RECOVERING LIQUID AND SOLID CONSTITUENTS OF WATER SOLUTIONS CONTAINING SPARINGLY SOLUBLE SOLIDS

FIELD OF THE INVENTION

This invention relates to a method and apparatus for separating aqueous solutions containing sparingly soluble solids into useable constituents including the purifying of waste waters from industrial and power plants so that the plants may operate with a capability of a zero polluted effluent discharge and yet require only the disposal of a very small volume of sludge which in many instances may have a by-product value. Specifically, the invention provides a closed loop system for the recovery of water and solids from hydrometallurgical solutions, effluent of industrial and power plants and the like while the closed loop system only requires a low input of energy, utilizes reverse osmosis technology, chemically treats the brine effluent to reduce sparingly soluble constituents to prevent fouling of the reverse osmosis membrane, reintroduces the water content of the brine effluent back into the system for zero or minimal discharge of effluent and yields small easily handled volumes of substantially solid sludge which may have sufficient fertilizer or recoverable metal value to warrant processing.

THE PRIOR ART

Reverse osmosis systems, commonly called RO systems, which are utilized in water treatment, conventionally produce a permeate (high quality water product) and a brine concentrate effluent. This effluent must be discharged in order to maintain a brine flow sufficient to prevent membrane fouling. Thus, as the product water or permeate is continually being extracted, the feed/brine flow over the membrane is reduced, and if it drops sufficiently, the concentration polarization will increase, causing the precipitation of sparingly soluble salts which foul the membrane. To decrease this fouling, brine flow has to be controlled at a sufficient rate resulting in a water recovery efficiency of only about 50 percent and a substantial discharge of pollutant containing brine which in many instances was damaging to the environment. Reduction of the discharged brine to a concentrate sludge required expensive evaporation equipment or large evaporation ponds.

SUMMARY OF THIS INVENTION

This invention now increases the separation efficiency of reverse osmosis water treatment to a range of 80 to 90 percent in a closed loop system yielding zero or minimal effluent discharge and minimal sludge volumes which are easily handled and may have value as a fertilizer or a source of metals.

According to this invention, industrial waste streams such as cooling tower blowdown, boiler blowdown, process waste streams of indistrial plants, hydrometallurgical streams, and the like water sources industrial dissolved and suspended solids are pretreated with chemicals to provide an influent stream at a predetermined level of chemical constituents. The chemical treatment may include acid, polyelectrolyte, phosphate and caustic feeds. The influent is filtered by application of media filtration to remove suspended solids as required. Clarification prior to the filter step can be used if the suspended solids are not feasily removed by media filtration without excessive backwash or damage to the media.

The water stream is conveniently collected in a pond or other satisfactory holding vessel. Water from the pond is fed through one or more mixing vessels where the proper chemical additions are made and where its temperature is controlled to provide a feedwater of from 60 to 95 degrees F. The chemically treated feedwater is then filtered to remove suspensed particulates. A backwash recycle is provided to flush the filtered suspended particulates back to the pond.

The chemically treated influent which has been filtered is pumped through a reverse osmosis station, hereinafter referred to as an RO unit, with the permeate being recovered and returned for reuse and with the concentrate being transferred to a concentrate reactor system for dissolved solids reduction.

An important feature of the invention is the recovery of a clarified effluent, which has a reduced level of sparingly soluble constituents from the concentrator reactor system. This clarified effluent is then fed back to the RO feed stream. This purified and clarified effluent is equal to or better than the chemical makeup of the RO influent and thereby a closed process loop is provided with the only effluent being reactor sludge. This sludge is fed to a decant or evaporator pond.

The quantity of sparingly soluble constituents in the water source is carefully monitored so that the water recovery from the reverse osmosis system is maintained at a level which is conducive to economical operation and yet remains prohibitive to fouling by the concentrate brine.

The system also includes automatic cleaning and product flush controls plus a control sequence implemented by a pressure drop instrument across the membrane of the RO unit. This instrument limits the pressure differential within prescribed ranges, which when exceeded, will automatically shut down the RO influent pump and control valves to isolate the RO unit for chemical cleanup. The chemical cleanup system includes temperature controls, automatic proportioning feeds, sequential feed and rinse cycles and the like.

A product water surge tank is also provided with a decarbonator to release $CO_2$ from the water and this tank provides a supply of product water to be used in rinsing the membrane surface in a product flush.

The brine which contains concentrated levels of the sparingly soluble constituents, as explained above, is chemically treated to precipitate the dissolved sparingly soluble solids with chemicals effective to carry out the following reactions:

1. $X_2(Y)_3 + 3Z(HCO_3)_2 \rightarrow 3ZY + 2X(OH)_3 + 6CO_2$

2. $Z(HCO_3)_2 + Z(OH)_2 \rightarrow 2ZCO_3 + 2H_2O$

The constituents represented by the symbols X, Y, and Z are:

X is a trivalent cation such as boron, aluminum, scandium, reduced titanium, chromium, manganese, oxidized iron, oxidized cobalt, oxidized nickel, gallium, arsenic, yttrium, reduced niobium, reduced molybdenum, rhodium, indium, reduced antimony, lanthanum, iridium, gold, oxidized thallium, reduced bismuth or the rare earths.

Y is a divalent anion such as sulfate, molybdate, phosphate, chromate, manganate, arsenate, borate, fluorosilicate, germanate, nitride, oxalate, sulfite, tellurite, thiosulfate, tungstate, or uranate.

Z is a divalent cation such as beryllium, magnesium, calcium, reduced vanadium, reduced chromium, reduced manganese, reduced iron, reduced cobalt, reduced nickel, copper, zinc, strontium, palladium, cadmium, barium, reduced paltinum, oxidized mercury, lead, polonium, or radium.

Since certain elements or compounds contained in either X, Y or Z are found in most natural waters, the chemical feed necessary to precipitate the sparingly soluble compounds will be reduced as the endogenous levels of X, Y and Z increase. In other words, the more dissolved solids or worse the water quality, the less chemical feed necessry.

It is then an object of this invention to provide a closed loop water purification system with zero effluent discharge and a small volume sludge discharge.

Another object of this invention is to provide a process for recovering water from waste streams of industrial plants or hydrometallurgical streams which recycles the water for reuse, has a zero or minimal pollutant effluent discharge, and recovers an easily handled concentrate sludge suitable for use as a source of metals, as land fill, as a fertilizer, and for other uses.

Another object of this invention is to increase the efficiency of reverse osmosis water recovery treatment from heretofor achieved levels of not more than 50 percent to levels of 80 to 90 percent.

A specific object of this invention is to recycle coolant tower blowdown water, boiler blowdown water and the like waste water streams in a coal fired steam generator plant and hydrometallurgical streams by reverse osmosis techniques with a brine concentrate recovery system upgrading the chemical content of the waste water influent to the RO unit.

A still further object of the invention is to provide a reverse osmosis water purification process which maintains a brine flow just sufficient to prevent membrane fouling, chemically treats the brine to precipitate sparingly soluble solids and recycles clarified brine solution for further purification.

A still further object of this invention is to provide a water purification treatment plant having a reverse osmosis unit with controls which automatically provide feedwater influent of desired chemical makeup, maintain a minimal brine flow just sufficient to prevent fouling of the membranes of the osmosis unit, chemically treats the brine to precipitate sparingly dissolved solids, and produce clarified brine which reenters as waste water influent and separates a by-product concentrated sludge.

A specific object of the invention is to provide a water purification system and process which adds reagents to the waste water influent for preventing precipitation of sparingly soluble compounds within the RO unit; concentrates these reagents in a brine discharge from a reverse osmosis unit; adds reagents which then induce precipitation of the sparingly soluble compounds forming a suspended sludge which is clarified. The clear liquid is fed back to the waste water influent while the concentrate sludge remains in the clarifier and by blowdown being removed thereby producing larger amounts of purified water from polluted water sources.

Another specific object of the invention is to provide a reverse osmosis water purification process and apparatus which produces a final water product relatively free from reactants, sparingly soluble species, and completely free from trace metals or residual organic materials.

Other and further objects of this invention will be apparent to those skilled in this art from the following detailed descriptions of the attached sheets of drawings:

ON THE DRAWINGS

AS SHOWN ON THE DRAWINGS

Figure 1:
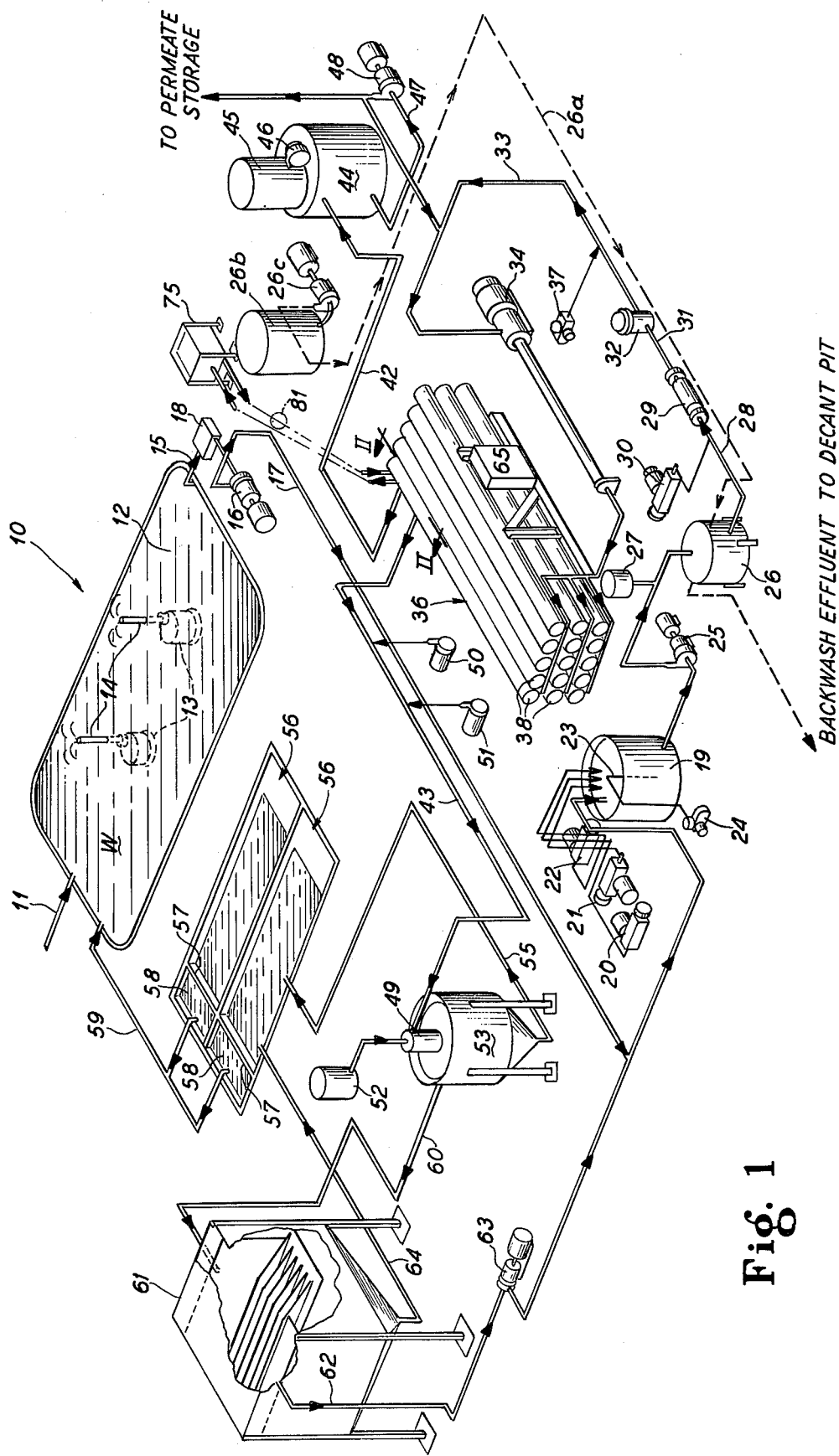
FIG. 1 is a diagrammatic generally perspective view of the system of this invention illustrating the process and generally showing the basic component and apparatus for carrying out the process.

In FIG. 1, the reference numeral 10 designates general apparatus for carrying out the process of this invention in flow sequence. As shown, the apparatus 10 includes an effluent discharge pipe 11 feeding water W from an industrial plant, hydrological mining operation, or the like source of water containing sparingly soluble solids, into a settling pond 12. The temperature of the water W can be lowered by spraying water from the pond into the air by means of submerged pumps 13 discharging through upstanding pipes 14. Water from the top of the pond is decanted through a pipe 15 to the inlet of a pump 16 which discharges to a pipe 17. A heat exchanger 18 can be provided in the feed pipe 15 to the pump 16 for raising the temperature of the influent.

In a specific application, such as cooling tower blowdown, direct heat transmission, thus temperature control, is accomplished by taking hot side blowdown direct to mixing vessel and by control blending a precise temperature can be maintained.

It is desirable to maintain influent temperatures between 60 to 95 degrees F. and preferably between 80 to 95 degrees F. and the water accordingly is cooled or heated, as necessary to bring the influent feedwater temperature within this range.

A large mixing vessel 19 receives the influent from the pipe 17 and first stage chemical feed stations 20, 21 and 22 supply controlled amounts of acid, caustic, chlorine, polyphosphate, or other chemical constituents as may be recommended to the mixing tank 19 for intimate mixture with the influent. A stirrer or the like agitator 23, driven from a power source 24, is provided to intimately admix the influent with the added chemicals.

By way of example, the chemical station 20 can supply sulfuric or hydrochloric acid of high concentration such as 93 to 100 percent, the station 21 can supply caustic, such as sodium hydroxide of a concentration of about 25 to 60 percent, and the third station 22 can supply a polyphosphate solution having a concentration of 30 to 50 percent. The chemical feeds are regulated to control the pH of the feedwater influent within the range of 7 to 8 and to provide the polyphosphate in sufficient quantity to prevent scaling in the succeeding apparatus and pipes. Generally an anti-scale polyphosphate material is supplied in the amounts of 5 to 10 milligrams per liter of influent.

The chemically treated influent with the adjusted pH value of 7 to 8 and containing the anti-scale polyphosphate is pumped from the vessel 19 via transfer pump 25 into a media filter unit 26. The influent to the filter 26 is preferably introduced with a polyelectrolyte from a source 27 for increasing the efficiency of the filter material in the unit 26 which may be a bed of sand or the like particulate material. Our suitable polyelectrolyte is "Catfloc" sold by Calgon Corporation.

The media filter 26 is backwashed as shown in dotted lines 26a from a supply yank 26b and pump 26c circulating cleaning solution through the media, such as sand, in the unit 26, and then pumping the slurry of solution and filtered solids to a sludge disposal pit as hereinafter described.

The filtered influent from the filter unit 26 is discharged through a pipe 28 to an in-line mixer 29 to mix the influent with acid supplied from a second stage chemical feed station 30 for reducing the pH of the influent to a range of about 5 to 5.5 to prepare it for the upcoming reverse osmosis treatment. The chemical feed station 30 can supply either sulfuric or hydrochloric acid to control the pH value of the influent discharged from the mixer 29. A pipe 31 conveys the acidified influent to a particulate filter unit 32 for removal of any remaining suspended particles in the influent. The unit 32 is a micron filter effective to remove particles exceeding 25 microns.

The filter unit 32 discharges through a pipe 33 to a high pressure feed pump 34 supplying the influent to a reverse osmosis unit 36 at pressures of about 400 to 800 p.s.i. Amino-phosphonte anti-scalants from a source 37 can be introduced into the pipe 33 to the pump 34 for insuring against precipitation and scale deposits in the RO unit. Aminophosphonates such as Monsanto's "Dequest Series" or Calgon's C.L. 77C can be supplied in varying amounts such as from 10 to 20 parts per million.

Figure 2:
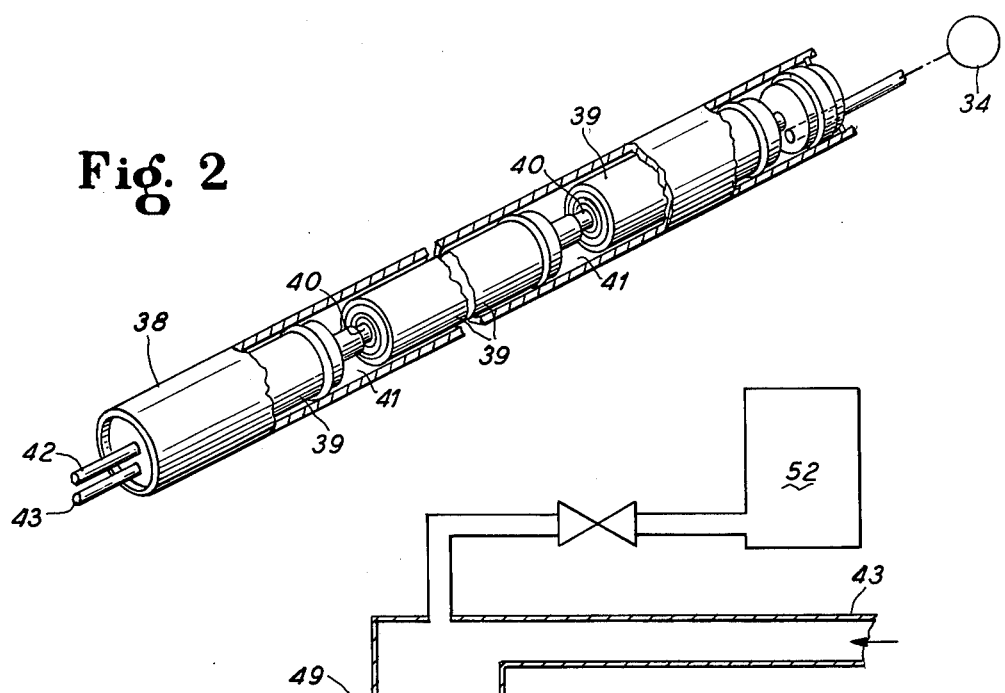
FIG. 2 is a fragmentary perspective view of a portion of one of the reverse osmosis pressure vessels with parts broken away to show the membrane cartridges.

The RO unit 36 is composed of a bank of high pressure tubular vessels 38, with each vessel as shown in FIG. 2, having a series of spirally wound membrane modules 39 successively receiving the influent and separating the same into a purified water forced through the membrane and collected in tubes 40 in the centers of the modules and a concentrated brine 41 flowing between the spiral windings of the membrane and through the modules. The bank of vessels 38 can be arranged in series or in parallel or in combinations of series and parallel arrangements with the purified water pr permeate discharging through a pipe 42 and a concentrated brine discharging through a pipe 43.

The permeate is conveyed by the pipe 42 to a surge tank 44 for holding before removal of carbon dioxide. The surge tank 44 has an aerator or decarbonator 45 and a blower 46 which aerates the permeate to release carbon dioxide to the atmosphere and raise the pH of the permeate to about 7. Alternatively the permeate could be treated with caustic or the like to control the pH. The decarbonated permeate is fed from the tank 44 through a pipe 47 to a permeate pump 48 from which it is discharged to a storage vessel (not shown) for reuse.

The brine concentrate from the RO unit 36 flows through the pipe 43 to a concentrate reactor 49 and enroute to the reactor it is supplied with chemicals from a third stage station including a caustic supply 50 and a sodium bicarbonate supply 51. The brine effluent from the RO unit has a pH of about 5.5 which is raised to about 7 by the caustic and sodium bicarbonate. The bicarbonate feed addition is such that the total levels of this constituent are in equal molar ratios to the calcium content of the brine.

THE CONCENTRATE REACTOR 49

Figure 3:
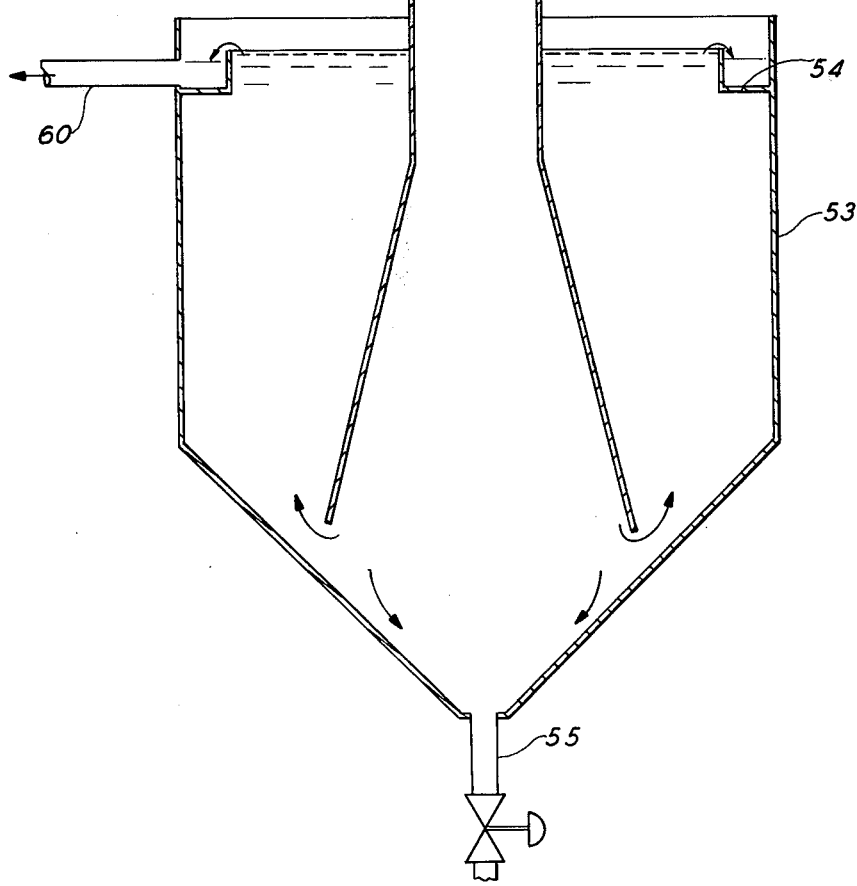
FIG. 3 is a diagrammatic view of the reduction reactor of the system.

As shown in FIG. 3, the reactor 49 receives the chemically adjusted pH 7 brine effluent from the pipe 43 and chemicals are added from a source 52 to carry out the reactions hereinabove set forth. The reactor 49 can be in the form of an inverted cone discharging into the bottom of a tank 53. Specifically, by way of example only, aluminum chloride may be added from the source 52 to precipitate the sulfate and calcium ions followed by a precipitation of the added aluminum as aluminum hydroxide with the driving force of the reaction being the release of carbon dioxide and leaving chlorine dissolved in the water according to the following equations:

$$2AlCl_3 + 3SO_4 = +3Ca^{++} +6HCO_3 \rightarrow 3CaSO_4 + 2Al(OH)_3 + 6CO_2 + 6Cl^-$$

Side reactions to the above primary reaction is a formation of hardness (calcium) hydroxides with calcium bicarbonate to precipitate calcium carbonate and release water according to the following equations:

$$Al_2(SO_4)_3 + Ca(HCO_3)_2 \rightarrow 3CaSO_4 + 2Al(OH)_3 + 6CO_2$$

$$Ca(OH)_2 + Ca(HCO_3)_2 \rightarrow 2CaCO_3 + H_2O$$

The top of the tank 53 has an annular trough 54 receiving clarified water rising through the tank as it emerges from the open bottom of the reactor cone 49 while sludge from the reactor settles to the bottom of the tank and is drained through a pipe 55 to a decant pit 56 which also receives the slurry from the media filter.

The decant pit has an inclined bottom with an overflow weir 57 at its deep end. Overflow from the weir 57 is collected in a decant point 58. Two such pits 56 are conveniently provided in side by side relation to be used successively while the idle pit can settle out the solid sludge and leave the liquid for evaporation to the atmosphere.

Clarified water from the decant pond sections 58 can be recirculated back to the waste water pone 12 through a pipeline 59. The sludge in the inclined pit upstream from the weir 57 being exposed to solar evaporation eventually produces a substantially solid "MUD" which can be removed by driving bulldozers or scoop shovels into the pit. This sludge, being high in mineral content, has a valuable by-produce use as a fertilizer, for land fill and in some instances as a metal recovery source.

The decant liquid from the overflow trough 54 of the tank 53 is discharged through a pipeline 60 to a polishing clarifier 61 having inclined conduits or plates receiving the water at the bottom for flowing upwardly to a top outlet 62 to be pumped by a recycle pump 63 back to the mix control vessel 19 while sludge slides down the inclines to a discharge line 64 to the pit pond 56.

The treated water decant from the concentrate reactor 49 is thus reused and since it contains previously added chemicals needed for the RO treatment, a saving of chemical feed is obtained.

It will thus be understood that the brine concentrate from the RO unit 36 is chemically treated to recover a useful water solution for reintroduction back into the system and small amounts of sludge which also have an economic value.

THE RO CONTROLS

The RO unit 36 has a control panel 65 for equipment maintaining a constant product flow, for controlling the product quality, and for automatically cleaning and flushing the RO membranes.

Figure 4:
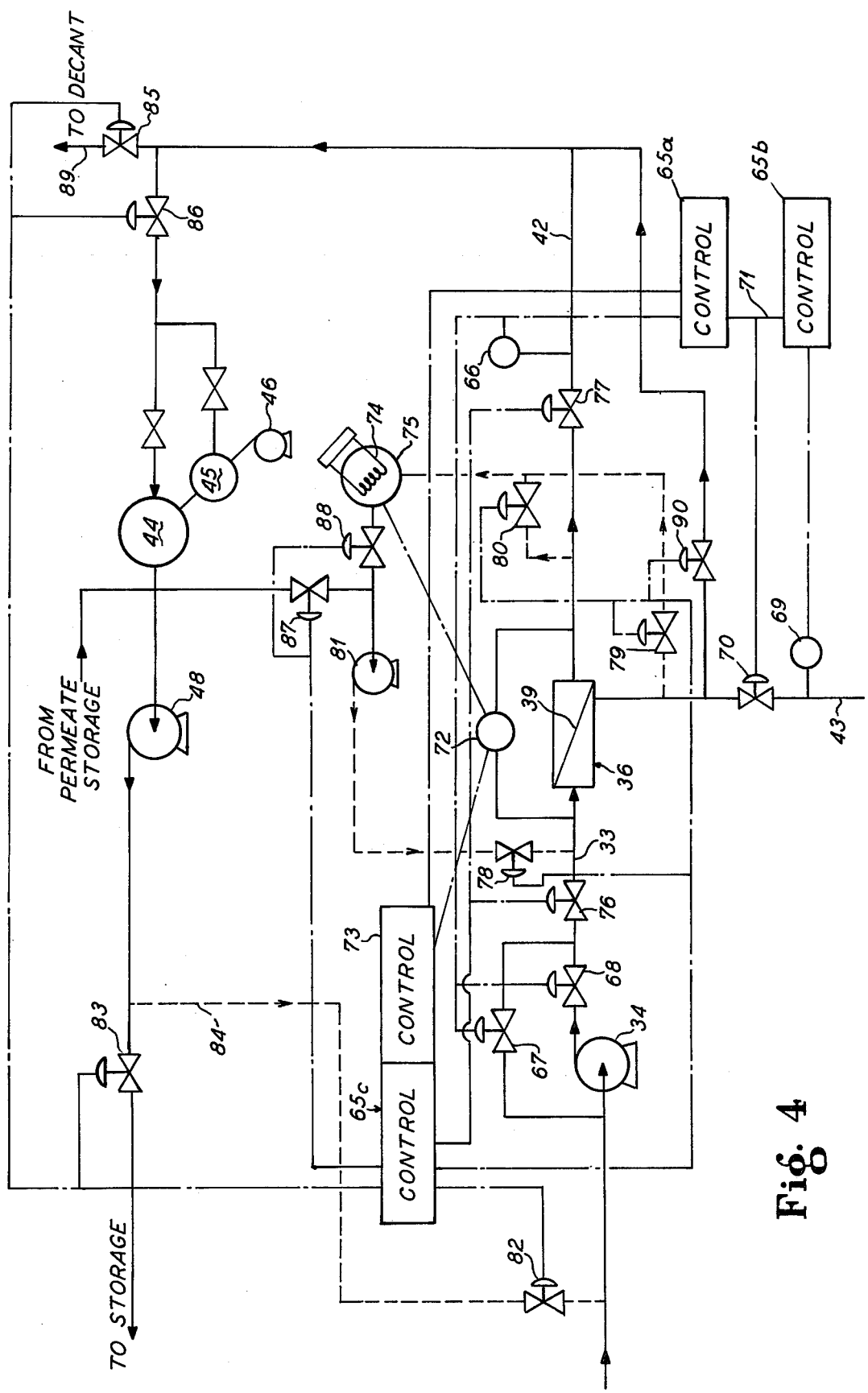
FIG. 4 is a diagrammatic view of the controls for the reverse osmosis apparatus.

In the flow diagram of FIG. 4, apparatus and pipelines described in FIG. 1, have been marked with the same reference numerals.

One section of the control panel 65, identified at 65a in FIG. 4, controls or programs a constant product flow through the RO unit 36. This controller is set by visual indication and manual control or by a programmer. As shown, a flow meter 66 registers flow through the permeate pipeline 42 sending a signal to the control section 65a which in turn relays the signal to modulate by-pass valve 67 and throttling valve 68 to increase or decrease the feed pressure from the high pressure pump 34 to the RO unit 36. This constant control flow of the permeate maintains the entire system in balance.

The control panel 65 also has a section 65b shown in FIG. 4 to determine the percentage of feed which is recovered as a product. This is expressed mathematically in units of gallons per minute as follows:

$$\% \text{ Recovery} = \frac{\text{Product Flow}}{\text{Feed Flow}} \times 100$$

The recovery is determined by two considerations, the first of which is product quality and the second of which controls the solubility limits of the salts in the brine concentrate stream. As shown in FIG. 4, a signal from a conductivity meter 69 in the brine pipe 43 relays a signal to the panel section 65b which in turn controls a modulating valve 70 to increase or decrease the brine flow through the pipe 43.

The control sections 65a and 65b are tied together at 71 so that the modulation of the recovery valve 70 is in conformity with the input feed from the high pressure pump 34 as controlled by the valves 67 and 68 and visa versa.

Chemical analysis and prototype studies of the chemical makeup of waste stream variables make possible the imposing of an area of safe operation in the percent of recovery that can be obtained without creating scaling problems. Thus, the system monitors the quantity of sparingly soluble constituents in the water source so that water recovery from the RO unit can be maintained at a level which is desirable for efficient economical operation which excludes fouling of the membranes. Efficiencies up to 80 to 90 percent recovery are made practical.

The control panel 65 has a third section 65c shown in FIG. 4 which provides for the automatic cleaning and control of product flushing in the RO unit. For this purpose, a pressure differential indicator and controller 72 senses the differential pressure across the RO membrane 39 sending a signal to an automatic cleaning control or programmer 73 which is part of the panel section 65c. A signal is also sent to a heater 74 of a chemical cleaning tank 75. The cleaning tank contains a solution of detergent for washing the membrane 39 which is brought up to the desired temperature by the heater 74 whereupon a valve 76 in the feed line 33 is closed together with valve 70 in the brine discharge line 43, and a valve 77 in the permeate product line 42.

The closing of valves 76, 70 and 77 isolates the RO unit 36 from the influent, the brine, and the permeate lines 33, 43, and 42. After closure of these valves, corresponding cleaning circuit valves 78, 79 and 80 are opened and cleaning circulation pump 81 is energized to circulate the heated cleaning fluid from the tank 75 through the membrane 39, washing the membrane surface.

After the washing cycle, the valve 88 is closed and a valve 87 is opened, valve 86 is closed, valves 85 and 90 are opened, allowing permeate water held in permeate storage to be flushed through membrane and then dumped through outlet 89 controlled by valve 85.

In this sequence, therefore, the membrane 39 is first washed with detergent and then rinsed with permeate water for flushing the detergent cleaning compounds from the membrane.

Upon completion of the cleaning and flushing cycle, the control panel 65c reverses the valves to place the system back on stream.

Also incorporated into the control panel 65 and programmer 73 is a periodic timed control permeate flush cycle. This cycle is similar to permeate flush cycle after cleaning, except the high pressure pump 34 is utilized in lieu of the cleaning pump 48. Valves 70, 83 and 86 close and valves 82, 85 and 90 open providing permeate high pressure flush of the membrane surface. The flush effluent flows through system and is then dumped through outlet 89 to decant pit or pond.

It will, therefore, be understood that the RO unit is automatically controlled to provide a constant flow of product, to recover the maximum amount of product without fouling the unit, and to automatically clean and flush the unit either upon fouling or at prescribed time cycles.

From the above descriptions, it should be readily understood that this invention provides an economical, low power input, water treatment processs and system involving reverse osmosis technology which is controlled automatically to operate at maximum efficiency and with novel chemical treatment stations avoiding heretofore required expensive ion exchange technologies or distillation and evaporation techniques. The brine treatment feature of the invention makes possible great savings in chemical additives by utilizing the previously incorporated chemicals in a recovered clarified water constituent of the brine while discharging only small amounts of a concentrated sludge. The system and process of the invention do not require any polluted effluent discharge, and as a result, waste waters of industrial plants can be continually recycled for reuse without discharge of environmentally deleterious pollutants.

We claim as our invention:

1. In a method of recovering liquid and solid constituents of water solutions containing sparingly soluble solids using a reverse osmosis unit with a chemically treated, recycled brine stream, the improvements which comprise:

pre-treating the water solution with chemicals which increase the solubility of the sparingly soluble constituents thereof, flowing the pre-treated water solution through a reverse osmosis unit, controlling the rate of flow of the pre-treated water solution through the reverse osmosis unit just above a flow rate that would allow precipitation of solids inside of the reverse osmosis unit to discharge a supersaturated brine and purified water permeate, reacting the supersaturated brine with a trivalent cation to precipitate the sparingly soluble solids, flushing the reverse osmosis unit with permeate to prevent fouling of the membrane of the unit, and recovering the permeate.

2. The method of recovering liquid and solid constituents of water solution containing sparingly soluble solids which comprises:

adjusting the temperature of the water solution within a temperature range of about 60° to 95° F., adjusting the pH of the solution within the range of about 7 to 8, filtering the thus adjusted solution, reducing the pH of the filtered solution within the range of about 5 to 5.5, reacting the solution with a polyphosphonate to increase the solubility of the solids in the solution, pumping the reacted solution through a reverse osmosis unit to separate the solution into a permeate and a brine containing the dissolved solids, decarbonating the permeate from said unit to produce purified water, adjusting the pH of the brine from said unit to about 7, subjecting the adjusted brine to the following reactions:

1. $X_2(Y)_3 + 3Z(HCO_3)_2 \rightarrow 3ZY + 2X(OH)_3 + 6CO_2$

2. $X(HCO_3)_2 + Z(OH)_2 \rightarrow 2ZCO_3 + 2H_2O$ wherein:

X is a trivalent cation such as boron, aluminum, scansium, reduced titanium, chromium, manganese, oxidized iron, oxidized cobalt, oxidized nickel, gallium, arsenic, yttrium, reduced niobium, reduced molybdenum, rhodium, indium, reduced antimony, lanthanum, iridium, gold, oxidized thallium, reduced bismuth or the rare earths, Y is a divalent anion such as sulfate, molybdate, phosphate, chromate, mangnate, arsenate, borate, fluorosilicate, germanate, nitrite, oxalate, sulfite, tellurite, thiosulfate, tungstate or uranate, Z is a divalent cation such as beryllium, magnesium, calcium, reduced vanadium, reduced chromium, reduced manganese, reduced iron, reduced cobalt, reduced nickel, copper, zinc, strontium, palladium, cadmium, barium, reduced platinum, oxidized mercury, lead, polonium, or radium, separating the liquid and solid products of said reactions, and recycling the separated liquid to the water solution for further recovery therewith.

3. The method of claim 2 wherein the brine is subjected to the following representative reaction:

$2AlCl_3 + 3SO_4^{=} + 3Ca^{++} + 6HCO_3 \rightarrow 3CaSO_4 + 2Al(OH)_3 + 6CO_2 + 6Cl^{-}$.

4. The method of claim 2 wherein the solid products are collected as a flowable sludge which is settled to provide a further water constituent for recycling back to the water solution.

5. The method of claim 2 wherein the solution is pumped into the reverse osmosis unit at pressures of from 400 to 800 p.s.i..

6. The method of separating water containing sparingly soluble solids into its water and solids constituents which comprises:

reacting the water with a chemical increasing the solubility of the sparingly soluble solids in the water, pumping the water solution through a reverse osmosis unit to separate the reacted solution into purified water and a supersaturated brine containing the dissolved solids, reacting the supersaturated brine with trivalent cations to precipitate dissolved solids from the brine, separating the solids from the liquid portion of the thus reacted brine, and feeding the clarified liquid portion of the reacted brine to the water solution being fed to the reverse osmosis unit.

7. The method of claim 6 including the step of adjusting the pH of the water solution to 5 to 5.5 before pumping the solution into the unit.

8. The method of purifying waste waters containing dissolved sparingly soluble solids and suspended solids which comprise:

feeding the waste water to a settling pond, decanting water from the pond to a mixing control vessel, introducing chemicals into the vessel for admixture with the water to adjust the pH value of the water, adding anti-scalent to the water in the mixing vessel to increase the solubility of the sparingly soluble solids in the water and scaling of subsequent treating apparatus, pumping the chemically treated water through a reverse osmosis unit to separate the water into a supersaturated brine and a water permeate, decarbonating the permeate to provide purified water, chemically treating the supersaturated brine to precipitate solids therefrom, and recycling the liquid portion of the chemically treated supersaturated brine back to the settling pond.

9. The method of claim 8 including the step of collecting the precipitated solids in flowable sludge form and collecting the sludge in a solid evaporation pond.

10. In a reverse osmosis method of separating a water solution of solids into its water and solids constituents, the improvements which comprise:

reacting the solution with a polyphosphonate to increase the solubility of the sparingly soluble solid in the solution, controlling the rate of flow of the reacted solution through osmosis membranes just above a rate allowing precipitation of solids forming a supersaturated brine, chemically treating the thus formed supersaturated brine to precipitate solids therefrom, and recycling the liquid portion of the precipitated brine back to the water solution.

11. Apparatus for separating water solutions into constituent solid and purified water portions which comprises:

a settling pond for receiving the water solution, a feed pump for decanting water from said pond, heating and cooling means adjusting the temperature of the water input to said pump within the range of 65° to 95° F., a mixing vessel receiving the water from said pump, apparatus for introducing chemicals into said mixing vessel for adjusting the pH value of the water therein and for adding anti-scalent to the water, a filter receiving water from said mixing vessel, apparatus for introducing a polyphosphonate to the water after filtration to increase the solubility of the solids in the water solution, a reverse osmosis unit receiving water under pressure from said feed pump, membranes in said unit separating the water into a permeate and a brine, means controlling the flow rate through the unit just above a rate allowing precipitation of the solids and thereby form a supersaturated brine, a decarbonator receiving the permeate, a pump for pumping the decarbonated permeate to storage, a reactor receiving the supersaturated brine from the reverse osmosis unit, means for introducing chemicals into said reactor to precipitate solids from the supersaturated brine, a tank receiving the chemically treated supersaturated brine from the reactor having a bottom outlet for settled solids and a decanting top outlet for clarified brine liquid, a decant pit receiving the settled out solids from said tank, a polishing precipitator receiving the clarified brine from said tank, and a recycling pump feeding the clarified brine back to the mixing vessel for admixture with the water solution from the feed pump whereby dissolved chemicals in the clarified brine effectively decrease the amount of chemicals needed for adjusting the pH value and the anti-scalent capacity of the water fed to the filter.

12. The apparatus of claim 11 including an inline mixer receiving filtered solution from said filter, and a chemical injector feeding chemicals to the filtered solution entering the mixer for reducing the pH of the solution to about 5 to 5.5.

13. A closed loop apparatus for recycling waste water containing sparingly soluble solids from an industrial plant which comprises:

a settling pond receiving the waste water, a mixing vessel, means decanting water from pond to said vessel, means introducing chemicals to said vessel to adjust the pH of the solution within the range of 7 to 8, means filtering the chemically treated solution, means for introducing chemicals into the filtered solution to reduce the pH thereof within the range of 5 to 5.5, means for introducing chemicals into the reduced solution to increase the solubility of the sparingly soluble solids in the water, a reverse osmosis unit, a high pressure pump feeding the reduced pH solution to said unit for separating the solution into a water permeate and a supersaturated brine containing the solids, means controlling the flow rate through said unit just above a rate allowing precipitation of the solids, means feeding the permeate for reuse in the plant, means adding chemicals to the supersaturated brine effective to precipitate solids therefrom, means separating a solid sludge and a clarified brine from the chemically treated supersaturated brine, a decant pit receiving the sludge, means feeding decant water from the pit to the pond, and means feeding the clarified brine to the mixing vessel.

* * * * *